United States Patent [19]

Moosberg et al.

[11] Patent Number: 4,593,866
[45] Date of Patent: Jun. 10, 1986

[54] MAGNETIC BRAKE FOR BRAKING THE LINE SPOOL OF A FISHING REEL

[75] Inventors: Börje Moosberg, Mörrum; Jarding U. Karlsson, Svängsta, both of Sweden

[73] Assignee: Abu Aktiebolag, Svangsta, Sweden

[21] Appl. No.: 578,371

[22] Filed: Feb. 8, 1984

Related U.S. Application Data

[63] Continuation-in-part of Ser. No. 499,970, Jun. 1, 1983.

[51] Int. Cl.<sup>4</sup> ............................................. A01K 89/02
[52] U.S. Cl. ......................... 242/84.52 B; 242/84.1 R
[58] Field of Search ............... 242/84.52 B, 84.52 C, 242/84.1 R, 310; 310/93, 105

[56] References Cited

U.S. PATENT DOCUMENTS

| | | | |
|---|---|---|---|
| 1,812,220 | 6/1931 | Shakespeare, Jr. | 242/84.1 R |
| 2,482,428 | 9/1949 | Miller | 242/84.52 B |
| 3,603,524 | 9/1971 | Nurmse et al. | 242/84.1 R |
| 4,390,140 | 6/1983 | Karlsson et al. | 242/84.52 C |

FOREIGN PATENT DOCUMENTS

| | | | |
|---|---|---|---|
| 214801 | 1/1958 | Australia | 242/84.52 B |
| 145570 | 6/1954 | Sweden | 242/84.52 C |
| 1445801 | 8/1976 | United Kingdom | 242/84.52 B |
| 2092872 | 8/1982 | United Kingdom | 242/84.52 B |

Primary Examiner—Billy S. Taylor
Attorney, Agent, or Firm—Sheridan Neimark; Karl W. Flocks; A. Fred Starobin

[57] ABSTRACT

A fishing reel comprising a frame, a line spool rotatably and releasably mounted in the frame and an induction-type magnetic brake for braking the fishing reel during casting is disclosed, in which a number of permanent magnets are mounted on a support which is easily releasably fixed to one end of the frame and encloses an opening therein, and in which the pole support is easily removable together with the magnet poles as a unit for uncovering said opening, and said opening is of a sufficient dimension to permit withdrawal of the line spool through the uncovered opening. In the preferred embodiment, the magnet support also forms a support for one end of a spindle which supports the line spool in the reel frame.

3 Claims, 8 Drawing Figures

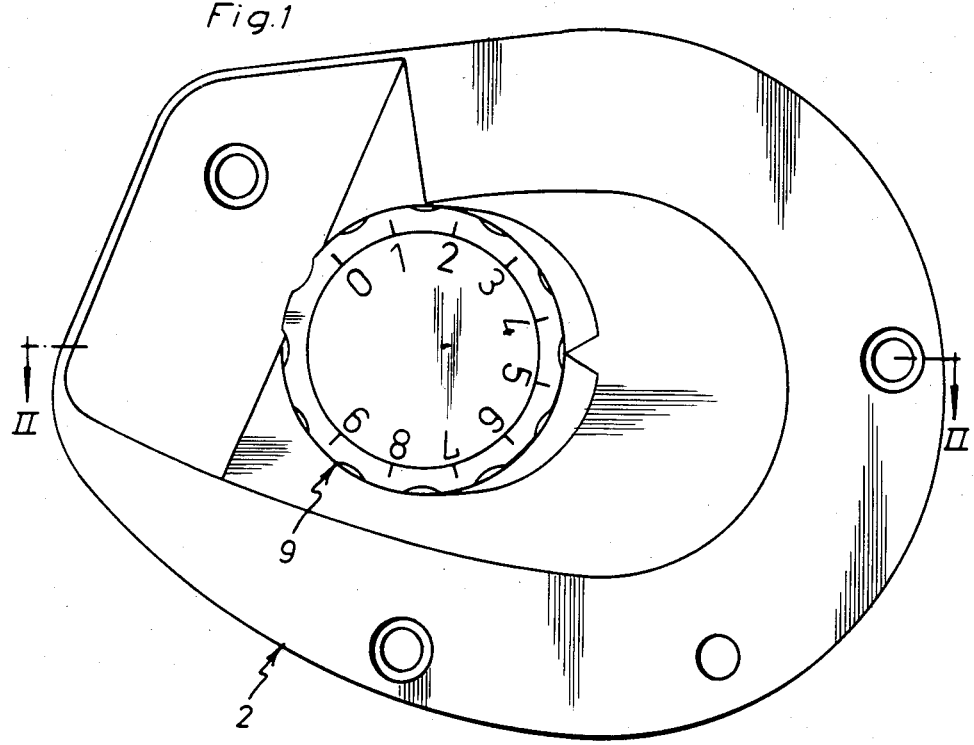
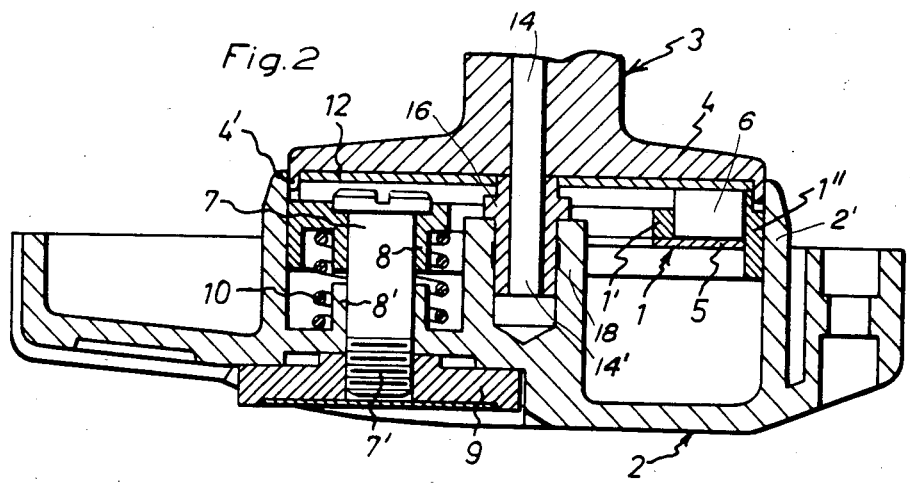

MAGNETIC BRAKE FOR BRAKING THE LINE SPOOL OF A FISHING REEL

The present application is a continuation-in-part of application, Ser. No. 499,970 filed on June 1, 1983; which application is relied upon and the entire disclosure and specification of which are hereby incorporated by reference.

This invention relates to a magnetic brake for inductive braking of the line spool of a fishing reel.

Magnetic brakes of this type are used for braking the line spool during casting, thereby to prevent rotation of the line spool at a speed higher than the reeling-out speed of the line, which usually results in backlash and overrunning of the spool with ensuing line entanglement.

Prior art magnetic brakes comprise permanent magnets which are stationarily mounted outside the line spool and are grouped around the extension of the axis of rotation of the line spool and which brake the line spool by magnetic induction in a part (rotor) rotatable together with the spool spindle.

Conventional fishing reels are constructed such that the line spool is removable from the reel frame after removing of a wall member fixed to one of the opposite ends of the reel frame by means of several screws. This wall member closes an end opening of the frame, and when it is removed, the line spool can be released and thereupon removed and reinstalled through the opening. The operations for removing and reinstalling the line spool are relatively troublesome and time-consuming, and moreover, for the screw-releasing and resetting operations, some type of hand tool is usually required.

It is, therefore, desirable that the construction of the fishing reel permits the line spool to be removed and reinstalled easily and more quickly, without necessitating the use of hand tools, in order to facilitate, inter alia, the exchange of one line spool for another, when the fishing line has been worn, broken or entangled, or when it is desired to use a stronger or a finer fishing line.

However, experience has shown that the average angler is more or less lacking in mechanical skill and, especially, that he has a loathing for fine-mechanical manipulations when he is fishing in cold and rainy weather.

It is also desirable that some other frequently occurring problems, such as the cleaning and lubricating of antifriction bearings or other bearing surfaces of rotating parts, can be executed easily and quickly by persons lacking technical and mechanical experience.

The exchange of the well-known overrunning brakes of the centrifugal type for overrunning brakes of the magnetic type was intended to improve the performance of the overrunning brake and to facilitate adjustment of the braking effect, which the encapsulated mounting of the conventional centrifugal brake made impossible or difficult to effectuate.

Another improvement which the new magnetic brakes was presumed to give, was to overcome the provoking problem of the loss of centrifugal braking weights in conjunction with dismantling and servicing.

However, though the functional improvements gained by the magnetic brakes are considerable, it has been found that further improvements are conceivable and desirable, in particular in respect of constructive features in combination with the construction of the fishing reel proper, but also further functional improvements of the magnetic brake as such are desirable and are achieved according to the invention, as will be explained below.

Therefore, it is a primary object of this invention to provide a fishing reel with an efficiency working and readily adjustable overrunning-preventing line spool brake of the magnetic type, and having a construction which simplifies maintenance and servicing not only of the brake proper but also of other essential parts of the fishing reel.

A second object of this invention is to provide a fishing reel as mentioned above and having an inductively operating line spool brake which comprises a relatively compact arrangement of permanent magnets mounted in an easily removable part of the fishing reel for cooperating with a metallic element rotating with the line spool, such as one of the end walls thereof.

A further object of this invention is to provide a fishing reel having an inductively operating line spool brake of the kind mentioned above and mounted on a supporting member which in turn is mounted on and easily removable from one of the opposite ends of the fishing reel frame and which comprises an end supporting or bearing means for the line spool shaft.

A still further object of this invention is to provide a line spool brake having permanent magnets supported on a removable supporting member of the kind mentioned above, wherein said member comprises means for adjusting the magnetic braking effect on the line spool, and wherein said supporting member is in the form of an easily detachable end cap closing an opening of sufficient dimension in one of the end walls of the reel frame to permit, when removed from said end wall and from said one end portion of the spool shaft, withdrawal of the line spool and the spool shaft as a unit by hand from the reel frame.

Another object is to provide a fishing reel having a line spool brake of the kind mentioned above and comprising a minimum of component parts.

These and other characteristic features of the invention will be described in more detail in the following, reference being had to the accompanying drawings in which:

FIG. 1 shows a stationary outer end wall of the fishing reel, with the adjusting knob for the magnetic brake;

FIG. 2 is a fragmentary section of the fishing reel, taken along line II—II in FIG. 1;

Figure 3:
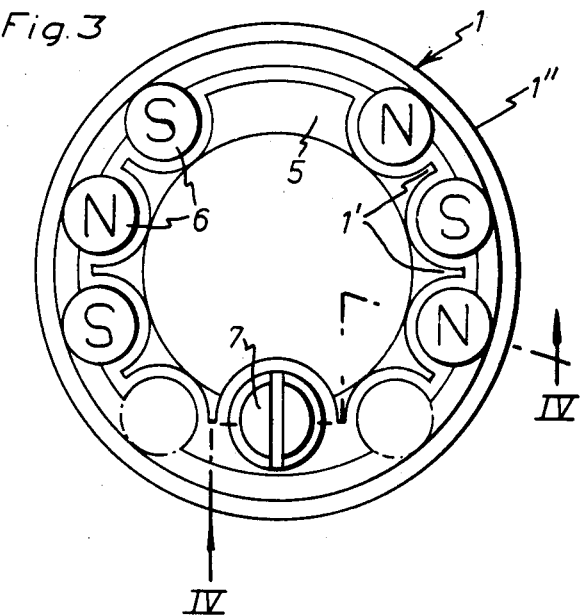
FIG. 3 is a plan view of the magnet support, showing the magnets mounted in position.

The fishing reel fragmentarily shown in FIGS. 1 and 2 comprises a magnetic brake according to the invention, which in the embodiment illustrated in FIGS. 1–4 comprises an annular magnet support generally designated 1 and detachably mounted in a circular hollow space which is provided in one end wall 2 of the frame (not shown in FIGS. 1-4) of the fishing reel and which is open towards one end wall 4 of a rotatable line spool 3. Disposed in the annular support 1 is an annular plate 5 which constitutes a planar bottom plate for a number of small cylindrical permanent magnets 6. As will appear from FIGS. 3 and 4, the plate has a radially inner ring-shaped wall 1' having formed therein a number of circular pockets preferably with segmental walls for partially enclosing the cylindrical permanent magnets 6 and the head end portion of a threaded bolt 7 which has a cylindrical shank portion extending through a sleeve-shaped wall portion 8 of the support 1 and is displaceably mounted in a sleeve-shaped wall portion 8' of the outer end wall 2, on the outer side of which the bolt 7, on a threaded end portion 7', carries an adjusting knob 9. As shown in FIG. 2, the bolt 7 and the support 1 are spring-loaded in a direction inwardly towards the line spool 3, 4 by means of a helical spring 10 inserted between the support 1 and the outer end wall 2. The bolt preferably is secured to the support 1 by friction or in some other manner and is displaceable relative to the sleeve-shaped portion 8'. The adjusting knob 9 which is mounted on the threaded portion of the bolt 7, has an inner flange engaging a planar supporting surface of the outer end wall 2. By turning the knob in one direction, the magnet support 1 can be moved in a direction away from the end wall 4 of the line spool 3, and by turning the knob in the opposite direction, the support is returned by the spring towards the line spool. In this manner, the gap 12 between the ends of the permanent magnets 6 and the spool end wall 4, and thus the magnetic force, can be varied.

Figure 4:
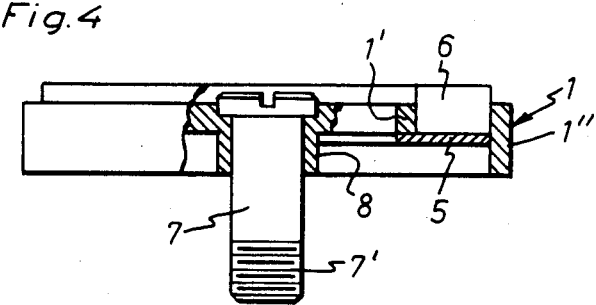
FIG. 4 is a side view of the magnet support which is shown partly in section along line IV—IV in FIG. 3.

As is shown in FIG. 4, the small cylindrical magnets 6 are so positioned that every other magnet has its north pole end and every other magnet has its south pole end facing the line spool. According to need, two magnets may be inserted or dispensed with, as is indicated by the dash and dot lines in FIG. 3. Thus, it is possible to use in a magnet support ring a desired number of magnets for different types and sizes of fishing reels, depending on the braking power which is required for braking line spools of different weights.

That part of the outer end wall of the fishing reel which is designated 2 in FIG. 1 is in the form of a detachable cap which is releasably fixed to the rest of the reel frame by means of a number of screws 25, and the magnet support ring 1 which preferably is made of plastic, is displaceably guided on the inner side of the cap. The end wall 4 may be made of metal, such as aluminum, or metallised for magnetic inductive cooperation with the magnets. The bottom plate 5 may be made of sheet metal or other magnetic material. The magnets are supported on the plate by their rear ends, and the plate closes the magnetic circuit. If desired, the plastic ring may be formed such that the magnets can be pressed into position in the pockets within the ring where they can be retained by friction and elastic clamping. It is also conceivable to combine these practical methods of securing the magnets in the magnet support.

The bottom plate 5 in the support 1 can engage a shoulder on the outer annular wall 1" of the support and can either be glued to the plastic ring or be detachable therefrom. As has been mentioned before, the bottom plate 5 preferably consists of a metal establishing a magnetic connection between the north and south poles of the magnets, but the bottom plate 5 may also be a plastic plate which for instance, or preferably, is made integral with the plastic ring, in which case the surface of the bottom plate in contact with the magnets should be metallised or carry a magnetically conductive metal disc.

The adjusting device is extremely simple in that it comprises but three independently dismountable components: the bolt, the adjusting knob and the spring. Mounting of the bolt only requires a cylindrical bearing surface on the bolt and a corresponding bearing or guiding surface in the sleeve-shaped portion 2' of the end wall member or cap 2 connected to the fishing reel frame.

In the magnetic brake according to the invention, the braking effect is controlled by axial adjustment of the distance of the magnets from the adjacent side of one end wall 4 of the line spool 3. In this manner, the total end area of the magnet poles and the maximum circumference of the line spool end wall 4 can be utilised. The air gap between the magnet poles and the line spool end wall 4 can be adjusted from a minimum which merely requires the line spool to go free from mechanical contact with the magnetic brake, to a maximum at which the braking effect of the magnets by magnetic induction in the line spool end wall 4 is substantially zero. The air gap or clearance can be reduced by means of a flange 4' on the outer circumference of the end wall 4.

The adjustment of the magnetic brake can be registered by means of an index marking from 0 to 9 on the adjusting knob and an index point on the end wall cap 2. By providing, for example, a pin and a spring as well as a number of recesses in the cap, a series of stop locations 0, 1, 2 . . . 10 can be established and sensed.

As shown in FIG. 2, the line spool is supported on a shaft 14, a projecting end portion of which is slidably and rotatably received in a sleeve 16 which in turn is inserted into a cylindrical bore formed in a central stud 18 projecting from the bottom of the cap 2, coaxially relative to and in the direction of the line spool 3. The latter may be rotatably mounted by means of antifriction bearings on the shaft 14. As an alternative, the end portion 14' of the shaft 14 shown in FIG. 2 may be journalled in antifriction bearings in the sleeve 16 or in the hollow stud 18. The cap 2 is removable after releasing of the screws 25 by means of which the cap is removably fixed on the frame (not shown) of the fishing reel, and when the cap is removed, the line spool may be withdrawn by hand.

As is evident from the above description, the brake according to FIGS. 1 and 2 comprises but a few component parts: the magnet support, i.e. the plastic ring and the bottom plate which consists of a sheet metal ring, the adjusting knob and the adjusting bolt (two components) with bearing surfaces, the sleeve-shaped portion in the cap with its bearing surface for the bolt, the planar bearing surface on the cap for supporting the knob, and the simple cylindrical magnets which may be from five to eight in number.

An essential advantage is that the line spool and the magnetic brake according to the invention are readily detachable. After releasing the cap 2 by releasing the screws 25 as explained above the cap can be removed from the reel frame, and the line spool can be withdrawn from the reel frame axially through the opening which has been uncovered in the reel frame by the removal of the cap 2. The magnet support is readily detached from the cap by unscrewing the knob 9 from the bolt 7 and removing the entire magnet support 1 together with the bolt 7. This means that the magnetic brake and the line spool can be mounted without difficulty also by unskilled workers during manufacture of the fishing reel and also that dismounting and reinstalling for overhauling and maintenance can readily be carried out by the angler himself under field conditions. The only hand tool he needs for such operations is a screw driver for releasing the screws 25. However, the screws 25 may be provided with enlarged knurled heads (not shown) by means of which the screws 25 may be released by hand without any tool.

FIGS. 5-8 show a preferred embodiment of the fishing reel according to the invention, in which the cap 2 according to the embodiment shown in FIGS. 1-4 is modified and generally designated 20. The cap 20 is releasably fixed in a circular opening 21 in an end wall member 22 which is releasably fixed to the reel frame 24 by means of several screws 25. It is to be observed that, in comparison with the cap 20 in the embodiment shown in FIGS. 5-8, the cap 2 according to FIGS. 1-4 is divided into two parts; one of these two parts is the end wall member 22 which forms a releasable part of the reel frame and a support for the releasable mounting of the other part, i.e. the cap 20, and it is evident that the cap 20 is more compact than the cap 2 in FIGS. 1-4. In fact, the cap 20 is dimensioned to match the diameter of the opening 21 in the frame end wall member 22 which in turn is of a dimension only sufficient to permit comfortable withdrawal of the line spool 3 together with the spool shaft 14 after removal of the cap 20. It is understood that the diameter of the cap 20 under these premises should be sufficiently greater than the diameter of the spool end walls 4 to permit the line spool to slide out through the opening 21 by gravity when the fishing reel is held with the rotational axis of the line spool in a vertical position.

Figure 5:
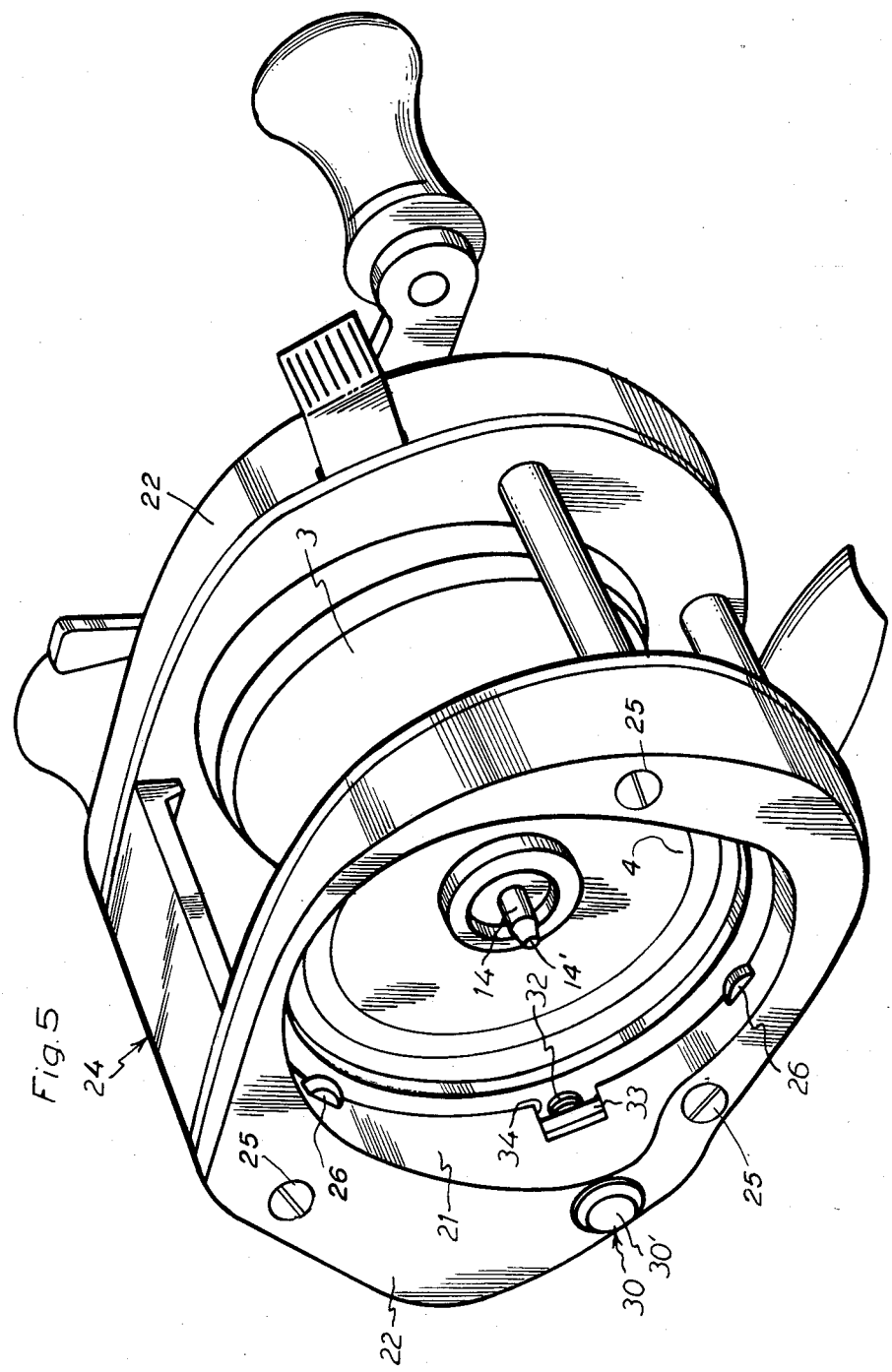
FIG. 5 is an enlarged perspective view of a preferred embodiment of the fishing reel with the detachable end cap removed to show the cap locking means and the end portion of the line spole shaft or spindle.
Figure 6:
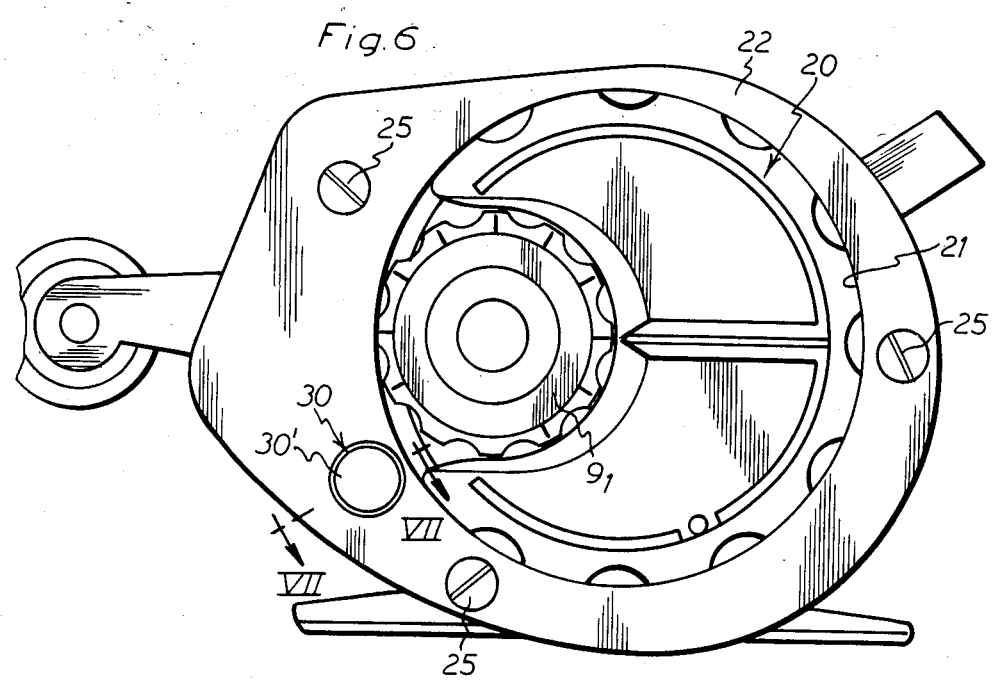
FIG. 6 is an end view of the fishing reel in FIG. 5 with the end cap mounted and releasably locked in position.
Figure 7:
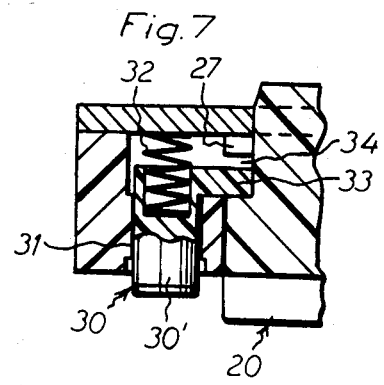
FIG. 7 is a fragmentary sectional view taken along line VII—VII in FIG. 6.
Figure 8:
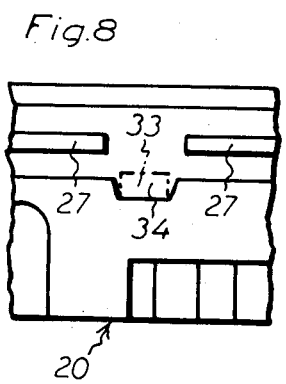
FIG. 8 is a fragmentary side view of the end cap including the portion thereof shown in FIG. 6.

The cap shown in FIGS. 6-8 is releasably mounted and locked in the opening 21 shown in FIG. 5 by means of bayonet coupling means in the form of knobs or shoulders, such as 26 in FIG. 5, protruding from the inner periphery of the opening 21 and cooperating knobs or shoulders, such as 27 in FIG. 8, protruding from the outer periphery of a cylindrical inner end portion of the cap 20. These protruding elements 26, 27 may be said to form fragmentary elements of a pair of mating threads from which spaced portions are broken away. These protruding elements 27 supported by the cap 20 are free to be moved axially through the spaces between the protruding elements 26, when the cap is inserted with its cylindrical inner end portion into the opening 21. Then, by rotating the cap through a small fraction of a full turn, for instance a few degrees, the protrusions of the cap are engaged under the protrusions in the inner periphery of the wall member 22. The cap 20 is locked automatically in this engaged position by means of a spring-loaded catch generally designated 30 and mounted in a hollow portion of the wall member 22. This catch is releasable by means of a push-button 30' in the form of a pin which is slidably mounted in a bore 31 formed in the wall member 22 and is accessible to a finger from the outer side of the wall member 22.

As shown in FIG. 7, the catch 30 is biased by means of a helical spring 32 and has a tab 33 which is movable into a recess 34 in the outer periphery of the cap 20 to lock the cap angularly in the engaged position thereof, in which the protrusions 26, 27 are in mutual engagement. After depression of the push-button 30, the cap may be turned to a free position, whereupon the cap may be removed from the wall member 22. The magnetic brake is then accessible as in the embodiment described with reference to FIGS. 1-4, and the line spool may be withdrawn through the opening 22. In this way, vital parts of the fishing reel are made accessible for maintenance.

Thus, by an easy depression of the push-button 31, the cap is free to be turned, and after turning the cap a few degrees it may be withdrawn, and when the cap is removed from the reel frame, a passage, i.e. the opening 21, is uncovered and permits the line spool to be withdrawn axially out of the reel frame. In a very short time, such as less than 60 seconds, the line spool may be removed, a new line spool inserted and the cap reinstalled and locked in position, whereupon the angler can go back to what he is interested in, i.e. fishing. Of course, when the cap 20 is detached, the magnetic brake is accessible for servicing as described with reference to FIGS. 1-4, and when also the line spool is removed, vital inner parts of the fishing reel are exposed for minor servicing, such as cleaning from grains of sand, lubricating etc.

In this way, many servicing operations, which the angler normally performs at home or leaves to some expert to be performed, may be effected easily by the angler himself during a short break in the fishing.

The invention is not restricted to the embodiments illustrated and described above but can be modified in different ways within the scope of the appended claims.

What we claim and desire to secure by Letters Patent is:

1. A fishing reel comprising a reel frame, a line spool rotatably mounted in the frame, an induction-type magnetic brake for braking the line spool during casting, said magnetic brake comprising a plurality of magnets each having first and second opposite pole ends, a magnet supporting member having means for supporting said magnets with said first pole ends in spaced relationship along an arc, said first pole ends being positioned in a common plane which is perpendicular to the axis of rotation of said line spool, said reel frame having at one end thereof an opening of sufficient dimension to permit insertion of said line spool axially therethrough into position within said frame, said magnet supporting member and said reel frame having cooperating securing means for releasably securing said supporting member on said frame in a position in which it closes said opening and supports said magnets with said arc of pole ends in a coaxial position relative to the axis of rotation of said line spool, said line spool at one end thereof facing said plane having means rotatable with said line spool at a short distance from said plane for inductive cooperation with said magnets, said magnet supporting member further supporting adjusting means accessible from the outer side of the fishing reel for adjusting the axial space of said plane relative to said means rotatable with the line spool, said magnet supporting member, when released from said reel frame, being removable from said frame together with said magnets, thereby exposing said opening to permit axial withdrawal and reinsertion of said line spool through said opening, said magnet supporting member including a cap member having a substantially cylindrical wall member, movable wall means including an annular wall member and an annular magnet supporting plate fixed thereto, said supporting plate comprising a magnet supporting surface of magnetically conductive material for contact with said second pole ends which are facing away from said line spool and said annular wall member having a substantially circular array of pockets arranged to receive and hold said magnets with said second pole ends in contact with said surface, said reel frame having at said one end a circular opening in coaxial alignment with said line spool, the diameter of said opening being sufficiently greater than the maximum diameter of the line spool to permit said axial withdrawal of said line spool therethrough from its position in the reel frame, said cylindrical wall member of said cap member being dimensioned for insertion into said opening, said reel frame in said opening and said cylindrical wall member of said cap member having cooperable engaging means formed to be brought into and out of engagement with each other by rotating said cap member is said opening through a small fraction of a full turn, said engaging means, when in engagement with each other, preventing withdrawal of said cap member, said cap member being provided with a catch including a spring-biased push-button accessible from the outer side of said cap member, said reel frame in a part thereof adjacent said opening having a bore and said push-button comprising a stem which is slidably mounted in said bore and supports a projecting tab protruding from said stem into said opening, a biasing spring means being mounted to act between said end wall member and said push-button in a direction tending to maintain said movable push-button in an outer end position, said push-button being movable manually to an inner end position against the action of said spring means, a recess being formed in said cylindrical wall portion of said cap member to receive said tab of said catch as soon as the cap inserted into said opening is rotated into an angular position in which said protrusions are engaged with one another, whereby said tab of said catch, when received in said recess prevents removal of said cap member from said opening in the reel frame by preventing rotation of the cap member into a disengaged position of said protrusions in relation to each other until said push-button is depressed to remove said tab from the engagement in said recess.

2. A fishing reel as claimed in claim 1, wherein said cooperable engaging means comprises protruding elements in said opening and on said cylindrical wall member, said protruding elements being in the form of spaced portions of a pair of mating threads from which intermediate spaced portions are broken away.

3. A fishing reel as claimed in claim 1 and comprising a spindle for supporting said line spool rotatably in said reel frame, said frame including opposite end wall members, said spindle having opposite end portions projecting from opposite ends of said line spool, and each of said opposite frame end walls supporting a journal box for rotatably supporting the corresponding one of said projecting spindle end portions, each journal box being open in the direction of said line spool and adapted to permit axial insertion therein of said corresponding spindle end portion, wherein said cap member supports one of said journal boxes which is fixed in a central part of said cap member and surrounded by said annular wall member which comprises said pockets in which said magnets are mounted, and wherein said cap member and said magnets, said adjusting means and said one journal box supported thereby are removable from said frame and from said spindle, respectively, as a unit by the removal of said cap member from said opening in said reel frame.

* * * * *